3,194,647
METHOD OF DESTROYING GRASSES
Robert J. Convery, Wilmington, Del., assignor to Sun Oil Company, Philadelphia, Pa., a corporation of New Jersey
No Drawing. Filed Dec. 12, 1962, Ser. No. 243,989
1 Claim. (Cl. 71—2.7)

This invention relates to methods of destroying or controlling vegetation. More particularly it relates to a method of destroying grasses which comprises applying thereto di (2-acetoxy ethyl mercuri) sulfate distended on an asphalt black carrier.

In U.S. Patent 3,031,484 issued April 24, 1962, I have disclosed the organic mercury compound which acts as the herbicide of the present invention. It is a yellowish white powder, soluble in water. The mercury compounds are prepared by first reacting ethylene with a mercuric salt of an alganoic acid having 1–10 carbon atoms per molecule in the presence of the free alkanoic acid and at a temperature in the range of 0–100° C. which temperature is above the melting point of the acid. This reaction forms the 2-acyloxy ethyl mercuri alkanoate. Sulfuric acid diluted with some of the alkanoic acid is then added to the reaction mixture causing di (2-acyloxy ethyl mercuri) sulfate to precipitate from the reaction mixture. For further details reference is made to the patent.

The asphalt black carrier of the present invention is disclosed in application Serial No. 214,128 filed August 1, 1962, of common assignment, the disclosure of which is incorporated by reference. Asphalt black is produced in the zinc chloride treatment of heavy asphaltic materials under certain conditions. Generally speaking a heavy asphaltic petroleum fraction having an initial boiling point of from about 500–1500° F. is contacted with from .1 to 200 wt. percent $ZnCl_2$ at a temperature in the range of 220–500° C. at ambient pressure. Gas, vapor, liquid and unreacted catalyst are separated and the asphalt black is recovered. This unique material is insoluble in hexane, benzene and $CCl_4$. The X-ray diffraction pattern has a between plane spacing of 3.38–3.43 Angstroms. It is characterized by a surface area ranging from about 65 to about 125 square meters per gram, infusibility below 500° C. and a hydrogen to carbon molecular ratio ranging from 0.35 to 0.80.

A typical preparation of asphalt black is as follows:
The feed was the heavy bottoms resulting from vacuum distillation of Venezuelan crude oil. The bottoms or residuum had the following properties:

Initial boiling point (atmos. press.) _____°/F__ 1050
Molecular weight-average-ebulloscopic _____ 815
Viscosity (Saybolt Universal Seconds) @ 210° F. __ 580

*Elemental analysis*

| | Wt. percent |
|---|---|
| C | 85.40 |
| H | 10.21 |
| S | 2.93 |
| N | 0.55 |
| O | 0.40 |
| Vanadium | 0.06 |
| Nickel | 0.005 |
| Iron | 0.001 |

408.6 g. of the residuum was placed in the reactor at 100° C. and atmospheric pressure and the reactor was swept with nitrogen. 104.1 g. of commerical reagent grade $ZnCl_2$ was added in powder form. 25 wt. percent (based on feed) was used. The mixture was heated to about 150° C. and stirring begun. Heating was continued and the initial reaction temperature was about 250–275° C. as evidenced by the evolution of hydrogen. The reactants were maintained at a temperature of 320–360° C. for 23 hours. The gas and vapor products were continuously flashed off at about 320° C. and the hydrocarbons separated from hydrogen by collection in an air cooled trap followed by a Dry Ice cooled trap. In addition to hydrogen the products included ethane, propane, isobutane, n-butane, isopentane, n-pentane, hexanes, propylene, butylenes, pentenes, hexenes and aromatic ends. The liquids and solids from the reactor were cooled to about 50° C. and washed with 3–500 cc. volumes of n-hexane. The liquid fraction was chromatographed on alumina in a column. A wax-oil fraction was desorbed from the column with hexane and the wax was deoiled with methyl ethyl ketone. The wax product was a micro wax having a melt point of 139° F. and a molecular weight of 605. The lube oil fraction had a viscosity index of 125 and a molecular weight of 770. Next an aromatic fraction was desorbed from the column with a mixed methanol-benzene solvent. The aromatics in the fraction were further concentrated using a clay-silica gel colmun employing the Shell Method (see ASTM Standards on Petroleum Products and Lubricants, 38th edition, October 1961, pp. 1235–1241). The aromatic fraction was a very viscous oil and is suitable for a rubber process oil. The asphalt black was separated by washing with methanol-$HCl$-$H_2O$ mix. The reaction produced 8.6% gas and vapor products, 50.0 wt. percent hexane solubles and 41.2 wt. percent asphalt black.

The composition of the invention can be prepared by mixing from .1 to 10 wt. percent of the active ingredient with asphalt black in any suitable manner. Preferably the ingredients are ground in conventional grinding and mixing equipment to provide a particle size of 60 to 325 mesh. If desired, the di (2-acetoxy ethyl mercuri) sulfate can be dissolved in water followed by contacting with asphalt black and drying so that the active agent is well distributed on the asphalt black carrier.

Although the composition of the invention is usually applied as a dust, it can be applied as a liquid spray. In this connection, conventional emulsifying agents, surface active agents, thickeners, stickers and other additives can be employed. The liquid medium can be water, hydrocarbon oils, kerosine, organic solvents and the like.

Significant herbicidal activity has been exhibited over the range of 10 to 100 pounds of the combined active agent and carrier per acre. The quantity used will depend on conditions existing at the time of application.

A herbicidal composition was prepared by grinding a mixture of 0.5 g. of di (2-acetoxy ethyl mercuri) sulfate together with 9.5 g. of asphalt black in a mortar and pestle to give a homogeneous mixture. The composition was dusted on crabgrass during June in New Castle County, Delaware, at the rate of 50 pounds per acre. After one week the composition had killed all the crabgrass in the treated area.

Substantially equivalent results are obtained by treating rye grass, mustard, foxtail and other grasses and broadleaf weeds.

One of the advantages of the composition is the excellent compatability of the active agent and the carrier. The high surface area of the asphalt black carrier permits adsorption of large amounts of the di (2-acetoxy ethyl mercuri) sulfate. The powder composition remains in discrete free-flowing form even under storage conditions. The black color outlines the treated area.

Obvious variations of the invention will occur to those skilled in the art and these are intended to be within the scope of the disclosure.

I claim:
A method for killing weeds which comprises applying to a locus to be protected a lethal concentration of di (2-acetoxy ethyl mercuri) sulfate adsorbed on an asphalt black carrier, said asphalt black being characterized by insolubility in hexane, benzene and $CCl_4$ and a surface area ranging from about 65 to about 125 square meters per gram.

References Cited by the Examiner

UNITED STATES PATENTS

| | | | |
|---|---|---|---|
| 1,882,377 | 10/32 | Whittelsey | 71—2.1 X |
| 2,062,823 | 12/36 | Ralston et al. | 71—2.1 |
| 3,031,484 | 4/62 | Convery | 260—431 |

FOREIGN PATENTS 1,112,405  11/55  France.

JULIAN S. LEVITT, *Primary Examiner.*